United States Patent [19]

Peters

[11] Patent Number: 5,028,681

[45] Date of Patent: Jul. 2, 1991

[54] NOVEL POLY(IMIDE-SILOXANE) BLOCK COPOLYMERS AND PROCESS FOR THEIR PREPARATION

[76] Inventor: Edward N. Peters, 51 West Street, Lenox, Mass. 01240

[21] Appl. No.: 309,899

[22] Filed: Feb. 13, 1989

Related U.S. Application Data

[63] Continuation of Ser. No. 947,908, Dec. 31, 1986, abandoned.

[51] Int. Cl.$^5$ .................................................. C08G 77/388
[52] U.S. Cl. ........................................ 528/27; 528/26; 528/28; 525/431
[58] Field of Search .................... 528/26, 27, 28; 525/431, 474

[56] References Cited

U.S. PATENT DOCUMENTS

| | | | |
|---|---|---|---|
| 3,325,450 | 6/1967 | Holub | 260/46.5 |
| 3,423,479 | 1/1969 | Hendricks | 260/824 |
| 3,539,656 | 11/1970 | Noshay et al. | 260/824 |
| 3,539,657 | 11/1970 | Noshay et al. | 260/824 |
| 3,740,305 | 6/1973 | Hoback et al. | 161/183 |
| 3,833,544 | 9/1974 | Takekoshi et al. | 260/47 CB |
| 3,833,546 | 9/1974 | Takekoshi et al. | 260/47 CP |
| 3,847,867 | 11/1974 | Heath | 260/47 CP |
| 3,905,942 | 9/1975 | Takekoshi et al. | 260/47 CP |
| 3,972,902 | 8/1976 | Heath et al. | 260/346.3 |
| 3,991,004 | 11/1976 | Takekoshi et al. | 260/37 N |
| 3,998,840 | 12/1976 | Williams et al. | 260/326 N |
| 4,011,279 | 3/1977 | Berger | 260/824 R |
| 4,039,605 | 8/1977 | Koerner | 528/26 |
| 4,051,163 | 9/1977 | Berger | 260/448.2 N |
| 4,293,670 | 10/1981 | Robeson et al. | 525/436 |
| 4,324,882 | 4/1982 | Takekoshi | 528/206 |
| 4,387,193 | 6/1983 | Giles, Jr. | 525/431 |
| 4,558,110 | 12/1985 | Lee | 528/26 |
| 4,611,048 | 9/1986 | Peters | 528/185 |

FOREIGN PATENT DOCUMENTS 257010 4/1970 U.S.S.R. .

OTHER PUBLICATIONS

Koton, M. M. & Florinski, F. S. (1968), *Zh. Org. Khin*, 5(5):774.

Noshay, A. and Matzner, M. (1974), *Die Angewandte Makromolekulare Chemie*, 37:215–218.

*Primary Examiner*—John C. Bleutge
*Assistant Examiner*—R. Dear, Jr.

[57] ABSTRACT

Novel poly(imide-siloxane) block copolymers and a process for their preparation are disclosed. The process of this invention involves reacting a hydroxy-terminated polyimide oligomer with a siloxane oligomer, which has reactive end groups capable of displacement by reaction with the hydroxyl groups of the hydroxy-terminated polyimide oligomer.

5 Claims, No Drawings

NOVEL POLY(IMIDE-SILOXANE) BLOCK COPOLYMERS AND PROCESS FOR THEIR PREPARATION

This is a continuation of application Ser. No. 947,908, filed Dec. 31, 1986, now abandoned.

BACKGROUND OF THE INVENTION

This invention relates to novel poly(imidesiloxane) block copolymers and a process for their preparation. More particularly, the invention concerns novel thermoplastic, injection moldable poly(imidesiloxane) block copolymers.

Heretofore, poly(imide-siloxane) copolymers have been prepared by reacting aromatic bis(dicarbonyl) compounds with amine-terminated polydiorganosiloxanes. These procedures have resulted in polymers in which the siloxane and polyimide segments are bonded together through imide linkages. For example, in U.S. Pat. Nos. 3,325,450 and 3,740,305, Holub discloses polymers prepared by reacting an aromatic dianhydride with an organic diamine and a diaminosiloxane in an organic solvent Similarly, U.S. Pat. No. 3,833,546 (Takekoshi et al.) and U.S. Pat. No. 3,847,867 (Heath et al.) disclose processes for making poly(imide-siloxane) copolymers which involve reacting an aromatic bis(ether anhydride) or an aromatic bis(ether dicarboxylic acid) with an aminoalkylene-terminated polydiorganosiloxane.

In U.S. Pat. No. 4,051,163, Berger discloses a process involving reacting an aromatic dianhydride with an organic diamine and an aminoalkylene-terminated polydiorganosiloxane in an organic solvent to form an amideacid block copolymer. The amideacid copolymer may be used as a coating material, which is converted to a poly(imide-siloxane) block copolymer in situ by curing at elevated temperatures. Berger further discloses, in U.S. Pat. No. 4,011,279, a process for making poly(imidesiloxane) copolymers which comprises reacting an aromatic dianhydride with an organic diamine to form an anhydride-terminated polyimide prepolymer, then reacting the polyimide prepolymer with an amine-terminated polydiorganosiloxane.

There is increasing interest in poly(imidesiloxane) block copolymers, particularly for use as modifiers for other polymer systems. Moreover, a need exists for more efficient and economical processes for preparing these valuable polymers.

SUMMARY OF THE INVENTION

The novel poly(imide-siloxane) block copolymers of the present invention are represented by the formula

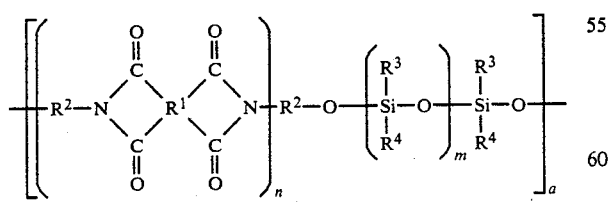

where $R^1$, $R^2$, $R^3$, $R^4$, n, m and a are as hereinafter defined.

Further disclosed, in accordance with the present invention, is a process for preparing a poly(imidesiloxane) block copolymer which involves reacting, under etherification conditions, a hydroxy-terminated poly- imide oligomer with a siloxane oligomer having reactive end groups. The reactive end groups of the siloxane oligomer are atoms or groups that are readily displaced by reaction with the hydroxyl groups of the hydroxy-terminated polyimide oligomer to yield a block copolymer wherein the blocks are joined by ether linkages.

DETAILED DESCRIPTION OF THE INVENTION

In the novel poly(imide-siloxane) block copolymers represented by the foregoing formula, "a" is an integer greater than 1, e.g., from about 10 to about 10,000 or more; n is an integer from about 4 to about 13, preferably from about 6 to about 9; m is an integer from 2 to about 40; $R^1$ is a tetravalent aromatic radical selected from the group consisting of

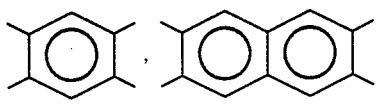

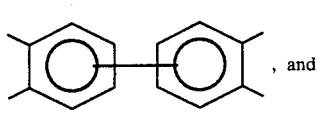

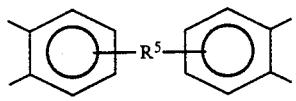

wherein $R^5$ is a member selected from the group consisting of —O—, —S—, —CO—, —SO$_2$—, $C_{(1-5)}$ alkylene and halogenated derivatives thereof, including perfluoroalkylene groups, and divalent radicals of the formula —O—Z—O—, wherein Z is a member selected from the group consisting of (A) divalent organic radicals of the formula

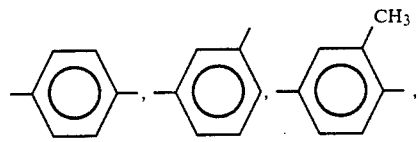

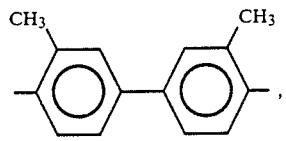

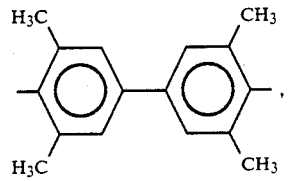

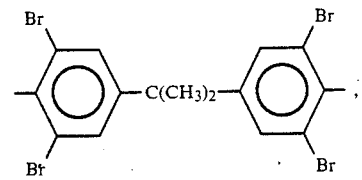

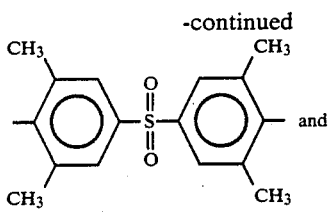

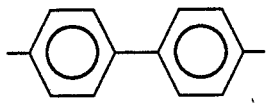 and

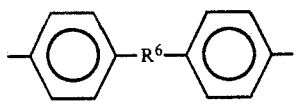

and (B) divalent organic radicals of the general formula

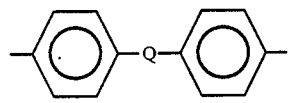

wherein $R^6$ is a member selected from the group consisting of —O—, —S—, —CO—, —SO$_2$—, $C_{(1-5)}$ alkylene and halogenated derivatives thereof, including perfluoroalkylene groups; $R^2$ is a divalent organic radical selected from the group consisting of (a) aromatic hydrocarbon radicals having from 6 to about 20 carbon atoms and halogenated derivatives thereof, (b) alkylene radicals having from 2 to about 20 carbon atoms, cycloalkylene radicals having from 3 to about 20 carbon atoms and (c) divalent radicals of the general formula

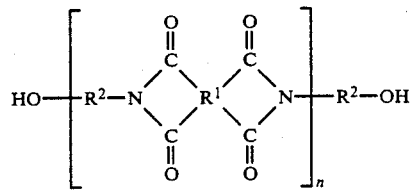

where Q is a member selected from the group consisting of —O—, —S—, —CO—, —SO— and $C_{(1-5)}$ alkylene; and $R^3$ and $R^4$ independently are $C_{(1-8)}$ alkyl radicals and halogenated and nitrile-substituted derivatives thereof and $C_{(6-13)}$ aryl radicals.

The poly(imide-siloxane) block copolymers may be prepared by a process which involves reacting a hydroxy-terminated polyimide oligomer with a siloxane oligomer having reactive end groups. The hydroxy-terminated polyimide oligomer may be represented by the formula $$\left[ HO - R^2 - N \underset{\underset{O}{\overset{\overset{O}{\|}}{C}}}{\overset{\overset{O}{\|}}{\overset{C}{\diagdown}}} R^1 \underset{\underset{O}{\overset{\overset{O}{\|}}{C}}}{\overset{\overset{O}{\|}}{\overset{C}{\diagup}}} N - R^2 - OH \right]_n$$

wherein $R^1$, $R^2$ and n have the meanings ascribed above. Hydroxy-terminated polyimide oligomers are described by Peters in U.S. Pat. No. 4,661,048, incorporated herein by reference. The hydroxy-terminated polyimide oligomer may be prepared by reacting an aromatic dianhydride of the formula

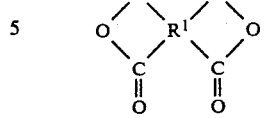

with a mixture of an organic diamine of the formula

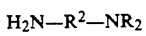

and a hydroxy organic amine of the formula

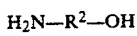

Skilled polymer chemists will appreciate that mixtures of dianhydrides and mixtures of diamines may be employed in making the hydroxy-terminated polyimide oligomer. Moreover, the $R^2$ groups in the organic diamine and the hydroxy organic amine may be the same or different.

The chain length of the hydroxy-terminated polyimide oligomer is controlled by the ratio of the hydroxy organic amine to the organic diamine. In general, the molar ratio of organic diamine to hydroxy organic amine ranges from about 0.5:1 to about 10:1, preferably from about 2:1 to about 6:1.

The hydroxy-terminated polyimide oligomer is advantageously prepared by a solution polymerization technique. The reactants are dispersed in an inert organic solvent and heated, under imidization conditions, to a temperature sufficiently high to effect the imidization reaction and to permit azeotropic distillation of water evolved during the reaction. The organic solvent is preferably a high-boiling, nonpolar, aprotic solvent, such as those described by Takekoshi et al. in U.S. Pat. No. 3,991,004, incorporated herein by reference. Polar, aprotic solvents and phenolic solvents as described by Takekoshi et al. in U.S. Pat. No. 3,905,942 (incorporated herein by reference) may also be used. Preferred solvents include benzene, toluene, xylene, ethylbenzene, propylbenzene, chlorobenzene, dichlorobenzene, trichlorobenzene, biphenyl, terphenyl, diphenylether, diphenylsulfide, acetophenone, chlorinated biphenyl and chlorinated diphenylethers. A particularly preferred solvent is o-dichlorobenzene.

The reaction is advantageously conducted under an inert atmosphere to prevent deleterious oxidation reactions. For example, the reaction solution may be blanketed with an atmosphere of dry nitrogen, helium, argon or the like. In addition the reaction solvent is preferably substantially anhydrous, and water of reaction advantageously is removed continuously to maintain substantially anhydrous conditions. The imidization reaction temperature may range from about 100° C. to about 220° C., preferably from about 160° C. to about 200° C.

If desired, a polymerization catalyst may be employed to accelerate the reaction between the aromatic dianhydride, the organic diamine and the hydroxy organic amine. Such catalysts are wel and are described, for example, in U.S. Pat. Nos. 3 33,544, 3,998,840 and 4,324,882, incorporated herein by reference. A preferred catalyst is sodium phenyl phosphinate. When employed, the catalyst is generally used in an amount of from about 0.01 to about 0.05 grams of catalyst per 100 grams of aromatic dianhydride.

Examples of aromatic dianhydrides which may be employed in the process of this invention include, pyromellitic dianhydride;
2,3,6,7-naphthalenetetracarboxylic acid dianhydride;
bis(3,40dicrboxyphenyl)ether dianhydride;
1,3-bis(2,3-dicarboxyphenoxy)benzene dianhydride;
1,4-bis(2,3-dicarboxyphenoxy)benzene dianhydride;
1,3-bis(3,4-dicarboxyphenoxy)benzene dianhydride; and
1,4-bis(3,4-dicarboxyphenoxy)benzene dianhydride;

A preferred class of aromatic dianhydrides includes aromatic bis(ether anhydride)s of formulas I, II and III, which follow:

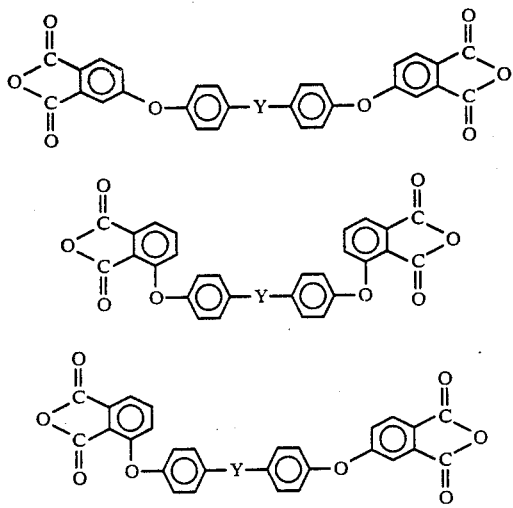

consisting of —O—, —S—, —CO—, —SO₂— and —ClCH₃)₂—.

Aromatic bis(ether anhydride)s of formula I include, for example:
2,2-bis[4-(3,4-dicarboxyphenoxy)phenyl]propane dianhydride;
4,4'-bis(3,4-dicarboxyphenoxy)diphenyl ether dianhydride;
4,4'-bis(3,4-dicarboxyphenoxy)diphenyl sulfide dianhydride;
4,4'-bis(3,4-dicarboxyphenoxy)benzophenone dianhydride;
4,4'-bis(3,4-dicarboxyphenoxy)diphenyl sulfone dianhydride; and mixtures thereof.

Aromatic bis(ether anhydride)s of formula II include, for example:
2,2-bis([4-(2,3-dicarboxyphenoxy)phenyl]propane dianhydride;
4,4'-bis(2,3-dicarboxyphenoxy)diphenyl ether dianhydride;
4,4'-bis(2,3-dicarboxyphenoxy)diphenyl sulfide dianhydride;
4,4'-bis(2,3-dicarboxyphenoxy)benzophenone dianhydride;
4,4'-bis(2,3-dicarboxyphenoxy)diphenyl sulfone dianhydride; and mixtures thereof.

The aromatic bis(ether anhydride)s of formula III may be, for example,
4-(2,3-dicarboxyphenoxy)-4'-(3,4-dicarboxyphenoxy) diphenyl-2,2-propane dianhydride.
4-(2,3-dicarboxyphenoxy)-4'-(3,4-dicarboxyphenoxy) diphenyl ether dianhydride;
4-(2,3-dicarboxyphenoxy)-4'-(3,4-dicarboxyphenoxy) diphenyl sulfide dianhydride;
4-(2,3-dicarboxyphenoxy)-4'-(3,4-dicarboxyphenoxy) benzophenone dianhydride;
4-(2,3-dicarboxyphenoxy)-4'-(3,4-dicarboxyphenoxy) diphenyl sulfone dianhydride, and mixtures thereof.

When a relatively rigid, linear aromatic dianhydride such as pyromellitic anhydride, 2,3,6,7-naphthalenetetracarboxylic acid dianhydride or bis(3,4-dicarboxyphenyl)ether dianhydride is employed, it advantageously is used in combination with a bis(ether anhydride) of formula I, II or III. Such combinations yield moldable polymers with desirable physical and chemical properties.

Some of the aromatic bis(ether anhydride)s described above are disclosed in U.S. Pat. No. 3,972,902 (Darrell Heath and Joseph Wirth). As described therein, the bis(ether anhydride)s can be prepared by the hydrolysis, followed by dehydration, of the reaction product of a nitrosubstituted phenyl dinitrile with a metal salt of dihydric phenol compound in the presence of a dipolar, aprotic solvent.

Additional aromatic bis(ether anhydride)s are described by Koton, M.M., Florinski, F.S., Bessonov, M.I. and Rudakov, A.P. (Institute of Heteroorganic Compounds, Academy of Sciences, U.S.S.R), U.S.S.R. patent 257,010, Nov. 11, 1969, Appl. May 3, 1967, and by M.M. Koton, F.S. Florinski, Zh. Org. Khin., 4(5), 774 (1968).

Examples of organic diamines that may be used in the process of this invention include, for example:
m-phenylenediamine,
p-phenylenediamine,
4,4'-diaminodiphenylpropane,
4,4'-diaminodiphenylmethane (commonly named 4,4'-methylenedianiline),
4,4'-diaminodiphenyl sulfide,
4,4'-diaminodiphenyl sulfone,
4,4'-diaminodoiphenyl ether (commonlY named 4,4'-oxydianiline),
1,5-diaminonaphthalene,
3,3-dimethylbenzidine,
3,3-dimethoxybenzidine,
2,4-bis(beta-amino-t-butyl)toluene,
bis(p-beta-amino-t-butylphenyl)ether,
bis(p-beta-methyl-o-aminophenyl)benzene,
1,3-diamino-4-isopropylbenzene,
1,2-bis(3-aminopropoxy)ethane,
benzidine,
m-xylylenediamine,
2,4-diaminotoluene,
2,6-diaminotoluene,
bis(4-aminocyclohexyl)methane,
3-methylheptamethylenediamine,
4,4-dimethylheptamethylenediamine,
2,11-dodecanediamine,
2,2-dimethylpropylenediamine,
octamethylenediamine,
3-methoxyhexamethylenediamine,
2,5-dimethylhexamethylenediamine,
2,5-dimethylheptamethylenediamine,
3-methylheptamethylenediamine,
5-methylnonamethylenediamine,
1-4,cyclohexanediamine,
1,12-octadecanediamine,
bis(3-aminopropyl)sulfide, N-methyl-bis(3-aminopropyl)amine,
hexamethylenediamine,
heptamethylenediamine,
nonamethylenediamine,
decamethylenediamine, and mixtures of such diamines.

Examples of hydroxy organic amines that may be used in the process of this invention include the foregoing diamines wherein a hydroxyl group is substituted for an amino group.

Advantageously, the hydroxy-terminated polyimide oligomer is recovered from the reaction solution prior to its reaction with the siloxane oligomer. Such separation may be effected by various procedures, such as distillative removal of the solvent, or precipitation by addition of a co-solvent (e.g., methanol) followed by filtration or centrifugation. Alternatively, the siloxane oligomer may be added directly to the reaction solution which contains the hydroxy-terminated polyimide oligomer.

The siloxane oligomer used in this process may be represented by the formula

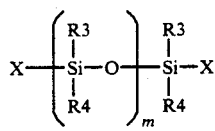

wherein $R^3$, $R^4$ and m have the meanings ascribed above. $R^3$ and $R^4$ preferably are independently selected from the group consisting of methyl, phenyl, cyanoethyl and trifluoromethylethyl. The integer, m, preferably ranges from about 5 to about 25, most preferably from about 10 to about 22. X represents a reactive end group that is capable of displacement by reaction with a hydroxyl group of the hydroxy-terminated polyimide oligomer. Reaction between such reactive end groups and hydroxyl groups results in the formation of ether linkages between the oligomers. Numerous reactive end groups are known, and include, for example, halogen atoms; lower dialkylamino groups of from 2 to about 20 carbon atoms; lower acyl groups of from 2 to about 20 carbon atoms; lower alkoxy of from 2 to about 20 carbon atoms; and hydrogen. U.S. Pat. No. 3,539,657 (Noshay et al.), incorporated herein by reference, discloses certain siloxane-polyarylene polyether block copolymers, and describes, in general and specific terms, numerous siloxane oligomers having reactive end groups. Particularly preferred siloxane oligomers are those in which X represents a dimethylamino group, an acetyl group or a chlorine atom.

The reaction between the hydroxy-terminated polyimide oligomer and the siloxane oligomer is conducted under etherification conditions. Such conditions generally include a substantially anhydrous, organic reaction medium and an elevated temperature. The temperature advantageously ranges from about 100° C. to about 225° C., preferably from about 150° C. to about 200° C. The reaction is conducted in an inert organic solvent, and preferred solvents are the non-polar aprotic and polar aprotic reaction solvents referred to above in connection with the reaction of the aromatic dianhdyride with the organic diamine and hydroxy organic amine. A particularly preferred reaction solvent is o-dichlorobenzene.

Any order of addition of the reactants may be employed, and a preferred procedure involves heating a solution of the hydroxy-terminated polyimide oligomer to the desired reaction temperature, then slowly adding the siloxane ologimer. The hydroxy terminated polyimide oligomer and the siloxane oligomer are employed in substantially equimolar amounts; e.g., the molar ratio of the hydroxy-terminated polyimide oligomer to the siloxane oligomer ranges from about 0.8:1 to about 1.2:1, preferably from about 0.9:1 to about 1.1:1.

The reaction is allowed to proceed until a substantial portion, preferably substantially all of the oligomers have reacted. Generally, the reaction will be complete within a few minutes to several hours or more, depending upon the reactants, temperature, size of reaction batch and the like.

The resulting poly(imide-siloxane) block copolymer may be recovered from the reaction solution by any convenient means. A preferred recovery procedure involves precipitating the polymer by addition of a co-solvent, such as methanol, then washing, e.g., with methanol, and drying under vacuum.

The process of this invention has been found to produce high quality poly(imide-siloxane) block copolymers having relatively high intrinsic viscosities and excellent physical and chemical properties. The process is efficient and employs relatively low-cost, readily available equipment and materials.

The novel block copolymers of this invention are characterized by desirable physical and chemical properties. By increasing the siloxane and ether content of the copolymers, flexible, elastomeric polymers are produced. The block copolymers are injection moldable and may be blended with a variety of other engineering thermoplastics. These block copolymers have been found particularly useful as impact modifiers for other polymer systems. For example blends of a poly(imidesiloxane) block copolymer with a polyetherimide (as described, for example, by Heath et al., U.S. Pat. No. 3,847,867, incorporated herein by reference) or a polysulfone (as described, for example, by Robeson et al., U.S. Pat. No. 4,293,670, incorpoated herein by reference) have been found to have enhanced impact strengths, as compared to the unmodified polymers. Such blends generally contain from about 0.5% to about 99% by wt., preferably from about 1% to about 20% by weight of the poly(imide-siloxane) block copolymer and from about 99.5% to about 1%, preferably from about 99% to about 80% by wt. of the engineering thermoplastics. The block copolymers and polymer blends containing them may further contain a wide variety of fillers, reinforcing agents, pigments and the like.

The invention is further illustrated by the following examples which are not intended to be limiting.

EXAMPLE 1

This example describes the preparation of a hydroxy-terminated polyimide oligomer. Into a five liter, 3-necked flask equipped with a mechanical stirrer, a thermometer, a nitrogen inlet, a Dean-Stark trap and a condenser were added 1145.03 grams (2.200 moles) of 2,2-bis[4-(3,4-dicarboxyphenoxy)phenyl]propane dianhydride ("BPA-DA"), 0.20 grams of sodium phenyl phosphinate and 2,000 ml of o-dichlorobenzene. The solution was blanketed under a stream of dry nitrogen and was stirred at 60° C. for 30 minutes, then 216.28 grams (2.000 moles) of m-phenylenediamine were added. After stirring for 30 minutes, 43.65 grams (0.400 moles) of p-aminophenol were added to the solution and the temperature was slowly increased to 180° C. with azeotropic removal of water. After two hours at 180° C., the reaction solution was cooled and methanol was added to cause precipitation of the oligomer. The oligomer was removed by filtration and dried. The resulting hydroxy-terminated polyimide oligomer had an intrinsic viscosity (measured in chloroform) of 0.18 dl/g and a number average molecular weight ($M_N$) of 3,660, as determined by gel permeation chromatography.

EXAMPLE 2

This example describes the preparation of a poly(imide-siloxane) block copolymer in accordance with the process of this invention. Into a one liter, 3-necked flask equipped with a mechanical stirrer, reflux condenser, and nitrogen inlet were added 100 grams (0.0273 moles) of the hydroxy-terminated polyimide oligomer prepared by the procedure of Example 1 and 600 ml of o-dichlorobenzene. The solution was heated to boiling and a portion of the solvent was distilled out to remove traces of moisture. Bis(dimethylamine) terminated polydimethyl siloxane (114 grams, 0.273 moles) was slowly added to the refluxing solution. After addition of the siloxane oligomer was complete, the solution was cooled and methanol was added to cause precipitation of the polymer. The polymer was separated from the solution by filtration and dried under vacuum at 100° C. The resulting polymer had an intrinsic viscosity of 0.67 dl/g, determined in chloroform. The dried polymer was compression molded into a test bar and was found to have a glass transition temperature ($T_g$) of 202° C., a tensile modulus of 19,500 psi and a tensile strength of 2,500 psi.

EXAMPLE 3

The procedure was Example 2 was repeated in all essential details except that a higher molecular weight bis(dimethylamine) terminated polydimethyl-siloxane was employed. The siloxane oligomer employed in Example 2 had a molecular weight of 4,200 and the siloxane oligomer employed in the present example had a molecular weight of 6,700. Accordingly, 180 grams (0.0273 moles) of the higher molecular weight siloxane oligomer were substituted for the 114 grams of siloxane oligomer employed in Example 2. The reaction was conducted by the same procedure as described in Example 2, however, the final polymer was redissolved in chloroform and precipitated in methanol and dried prior to molding and testing. The resulting polymer had an intrinsic viscosity of 0.72 dl/g (in chloroform), a $T_g$ of 202° C., a tensile modulus of 11,000 psi, a tensile strength of 1,300 psi and a yield elongation greater than 150%.

EXAMPLE 4

The procedure of Example 2 was repeated in all essential details except that 260 grams (0.0273 moles) of a bis(dimethylamine) terminated polydimethylsiloxane having a molecular weight of 9,500 was employed. The resulting block copolymer was an opaque, elastomeric material having an intrinsic viscosity of 0.67 dl/g (in chloroform), a Tg of 203° C., a tensile modulus of about 150 psi, and a tensile strength of about 750 psi. The block copolymer was a very flexible elastomeric material.

EXAMPLE 5

The procedure of Example 2 was repeated in all essential details except that a hydroxy-terminated polyimide oligomer having a molecular weight of 5,750 was substituted for the hydroxy-terminated polyimide oligomer of Example 2 (which had a molecular weight of 3,660). 100 grams (0.0174 moles) of the hydroxy-terminated polyimide oligomer and 73 grams (0.0174 moles) of the bis(dimethylamine) terminated polydimethylsiloxane were employed. The resulting block copolymer was an opaque flexible material having an intrinsic viscosity of 0.58 dl/g (in chloroform), a $T_g$ of 206° C., a tensile modulus of 32,000 psi and a tensile strength of 3,300 psi.

EXAMPLE 6

This example illustrates the use of the poly(imide-siloxane) block copolymers of this invention as impact modifiers for other polymer systems. Blends were prepared with varying proportions of the block copolymer prepared by the procedure of Example 5, a polyetherimide supplied by General Electric Company, Pittsfield, Massachusetts, U.S.A. under the trademark, ULTEM® 1000 and a polysulfone supplied by Union Carbide Corp., Danbury, Connecticut, U.S.A. under the trademark UDEL P-1700.

Fifty-gram samples of the blends were prepared by dissolving the polymers in chloroform and precipitating the polymer blend by mixing the chloroform solution with methanol. The solid blends were dried at 80° C. under vacuum for 15 hours and the resulting powders were compression molded into test bars and their notched Izod impact strengths were determined by ASTM procedure D256. The results of the tests, which are shown in Table I below, demonstrate that the novel poly(imide-siloxane) block copolymers of this invention are useful impact modifiers for engineering thermoplastics.

TABLE I

| Composition (Wt. %) | | | |
|---|---|---|---|
| Poly-(imide-siloxane) block copolymer | Poly-etherimide | Poly-sulfone | Notched Izod Impact Strength (ft.-lb./in.) |
| 0 | 100 | 0 | 0.8 |
| 5 | 95 | 0 | 3.2 |
| 3 | 97 | 0 | 2.7 |
| 0 | 0 | 100 | 0.9 |
| 5 | 0 | 95 | 4.6 |

I claim:

1. A poly(etherimide siloxane) block copolymer of the formula:

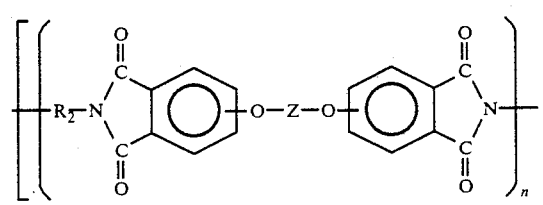

-continued

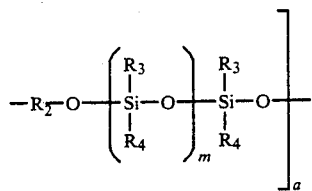

wherein "a" is an integer from 1 to about 10000; n is an integer from about 4 to about 13; m is an integer from about 2 to about 40; Z is a member selected from the group consisting of (A) divalent radicals of the formula

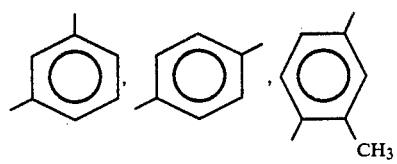

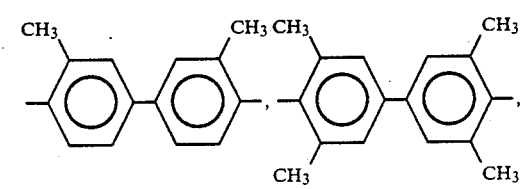

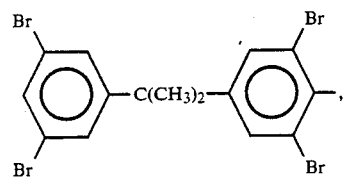

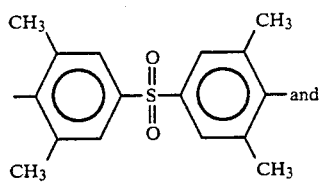

-continued

and (B) divalent organic radicals of the general formula

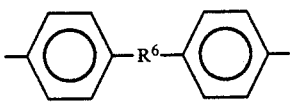

wherein $R^6$ is a member selected from the group consisting of —O—, —S—, —CO—, —SO$_2$—, C$_{(1-5)}$ alkylene and halogenate derivatives thereof;

$R^2$ is a divalent organic radical selected from the group consisting of (a) aromatic hydrocarbon radicals having from 6 to about 20 carbon atoms and halogenated derivatives thereof, (b) alkylene radicals having from 2 to about 20 carbon atoms, cycloalkylene radicals having from 3 to about 30 carbon atoms, and (c) divalent radicals of the general formula

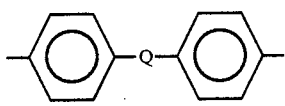

where Q is a member selected from the group consisting of —O—, —S—, —CO—, —SO$_2$— and C$_{(1-5)}$ alkylene;

$R^3$ and $R^4$ independently are selected from C$_{(1-8)}$ alkyl radicals, halo and nitrile substituted derivatives thereof or C$_{(6-13)}$ aryl radicals.

2. The block copolymer of claim 1, wherein m is an integer from about 5 to about 25.

3. The block copolymer of claim 1, wherein m is an integer from about 10 to about 22.

4. The block copolymer of claim 3, wherein $R^3$ and $R^4$ independently are selected from the group consisting of methyl, phenyl, cyanoethyl and trifluromethylethyl.

5. The block copolymer of claim 1, wherein $R^2$ is m-phenylene or p-phenylene or a mixture thereof.

* * * * *